UNITED STATES PATENT OFFICE.

JOKICHI TAKAMINE, JR., OF CLIFTON, NEW JERSEY.

PROCESS OF MAKING BEVERAGES.

1,412,378.  Specification of Letters Patent.  Patented Apr. 11, 1922.

No Drawing.  Application filed December 10, 1919. Serial No. 343,827.

*To all whom it may concern:*

Be it known that I, JOKICHI TAKAMINE, Jr., a subject of the Emperor of Japan, residing at Clifton, county of Passaic, State of New Jersey, have made a certain new and useful Invention in Processes of Making Beverages, of which the following is a specification.

This invention relates to a process for making beverages and more particularly beverages of the class known as cordials.

The object of the invention is to provide a simple, economical and efficient method of making beverages, particularly of the cordial class, and which embody therein a digesting agent without affecting the taste, color or aroma of the beverage or cordial.

A further object of the invention is to provide a process of making cordials and other beverages employing alcohol or alcoholic solutions, and containing an enzyme as a digesting agent and wherein the digestive properties of the enzyme are not impaired or injured by the alcoholic content of the cordial or beverage.

It is a common custom to supply a palatable cordial following meals. It is also a common practice, particularly with individuals affected with indigestion, to take digestive compounds of various kinds and in suitable quantites following meals as an aid to digestion. It is among the special purposes of my present invention to combine the after dinner cordial, for example, and a digesting agent in suitable proper quantities so that the after dinner cordial will contain a proper medicinal dose of the digestive compound and I have found that an enzyme such, for example, as takadiastase, pepsin, pancreatin or the like, or suitable compounds thereof will well answer the purpose.

It is well known that alcohol or alcoholic solutions are injurious to the active principle of digestive agents, that is, the alcohol attacks and destroys the digestive action of enzyme and other digesting agents. I have discovered, however, that by first dissolving the enzyme in a sugar solution and in proper quantities, before adding or mixing the same with the alcohol or alcoholic solution, the injurious effect of the alcohol upon the enzyme is practically entirely eliminated, and this protection from the injurious effects of the alcohol upon the enzyme afforded by the sugar or sugar solution with which the enzyme is mixed before adding the same to or mixing it with the alcohol or alcoholic solution continues practically indefinitely for all commercial purposes. In carrying out my invention I prefer to make a concentrated solution of the sugar and enzyme and then filter the solution to remove therefrom the more or less solid particles contained therein and I then mix together the filtrate and the other ingredients of the beverage, effecting such mixture quickly after the filtering operation so as to avoid any appreciable oxidizing action within the sugar and enzyme solution. I have discovered that the alcohol constituent of the beverage will arrest any further oxidation of the enzyme without injuring the digestive qualities of the enzyme. The sugar and enzyme solution, or the filtrate of such a solution, does not in any substantial or distinguishable way affect the taste, color, or aroma of the resulting beverage.

Apparently, according to my investigation, the sugar content of the enzyme solution serves the purpose of neutralizing and preventing the injurious action of the alcohol on the enzyme or other digesting agent without impairing the saccharine qualities of the sugar. This neutralizing and protecting action appears to be accomplished through the action of the sugar forming in effect a coating for the enzyme, which coating protects the enzyme against the injurious effects or action of the alcohol.

I have also discovered that it may be desirable to add a suitable solvent such as glycerine, or the like, according to the amount of enzyme added to dissolve any sediment or precipitation which might occur after an exceedingly long time in standing. The amount required for this purpose would not be sufficient to affect the taste. Likewise, if desired, a suitable stabilizer such as Indian gum may be added.

In practice I propose to supply the digesting agent, in the form of a sugar solution thereof, to the other constituents of the beverage in quantity, either in concentrated form or otherwise, hence it will be seen that I am enabled to turn a purely alcoholic beverage into a beneficial digestive agent without affecting its taste, color or aroma.

Having now set forth the objects and nature of my invention, what I claim as new and useful and of my own invention, and desire to secure by Letters Patent is:—

1. The process which consists in neutralizing the action of the alcoholic constituent of an alcoholic solution upon a digesting constituent of said solution by adding a protecting ingredient to the digesting constituent prior to mixing the same with the alcoholic constituent.

2. The process which consists in coating an enzyme with sugar and then placing the sugar coated enzyme in an alcoholic solution to form a digestive alcoholic beverage and then adding a stabilizer.

3. The process which consists in first forming a solution containing a digesting agent and sugar and then mixing such solution with alcoholic ingredients to form a digestive beverage and then adding a stabilizer.

4. The process which consists in forming a solution of sugar and enzyme, then filtering such solution and mixing together the filtrate and alcoholic ingredients to form a beverage.

5. The process which consists in neutralizing the action of the alcoholic constituent of an alcoholic solution upon a digesting constituent of said solution by adding a protecting ingredient to the digesting constituent prior to mixing the same with the alcoholic constituent, and finally adding an enzymic solvent to the solution.

6. The process which consists in coating an enzyme with sugar and then placing the sugar coated enzyme in an alcoholic solution to form a digestive alcoholic beverage, and finally adding glycerine to the beverage.

7. The process which consists in first forming a solution containing a digesting agent and sugar, and then mixing said solution with alcohol to form a digestive beverage, and finally adding an enzymic solvent.

8. The process which consists in neutralizing the action of the alcohol constituent of an alcoholic solution upon a digesting constituent of said solution by adding sugar to the digesting constituent prior to mixing the same with the alcoholic constituent.

9. The process of neutralizing the action of the alcohol constituent of an alcoholic solution upon an enzyme constituent of said solution which consists in adding sugar to the enzyme prior to mixing the same with the alcoholic solution.

In testimony whereof I have hereunto set my hand on this 3rd day of December A. D., 1919.

JOKICHI TAKAMINE, Jr.